(12) United States Patent  (10) Patent No.: US 6,648,226 B2
Haba  (45) Date of Patent: Nov. 18, 2003

(54) IMAGE READING APPARATUS AND METHOD

(75) Inventor: Yoshito Haba, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 161 days.

(21) Appl. No.: 09/938,572

(22) Filed: Aug. 27, 2001

(65) Prior Publication Data

US 2002/0027163 A1 Mar. 7, 2002

(30) Foreign Application Priority Data

Sep. 5, 2000 (JP) ........................................ 2000-268546

(51) Int. Cl.$^7$ ................................................. G06K 7/10
(52) U.S. Cl. ................................. 235/454; 235/462.25
(58) Field of Search .......... 235/462.01, 462.02–462.48, 235/454, 455, 472.01, 472.03

(56) References Cited

U.S. PATENT DOCUMENTS

| 4,641,357 | A | * | 2/1987 | Satoh | 382/317 |
| 4,701,804 | A | * | 10/1987 | Toyoda et al. | 358/444 |
| 4,761,772 | A | * | 8/1988 | Murakami | 369/30.04 |
| 5,095,372 | A | * | 3/1992 | Silverberg | 358/401 |
| 5,306,908 | A | * | 4/1994 | McConica et al. | 250/234 |
| 5,451,764 | A | * | 9/1995 | Houghton et al. | 235/494 |
| 5,682,562 | A | * | 10/1997 | Mizukoshi et al. | 396/159 |
| 5,957,596 | A | * | 9/1999 | Hastings et al. | 400/615.2 |
| 6,191,871 | B1 | * | 2/2001 | Miyamoto | 358/486 |

* cited by examiner

Primary Examiner—Thien M. Le
(74) Attorney, Agent, or Firm—Fitzpatrick, Cella, Harper & Scinto

(57) ABSTRACT

An image reading apparatus prevents degradation of image quality and a delay in the image reading time which are caused by interruption of reading of image data. A speed at which a host computer reads image data from an image reading apparatus and temporarily stores it therein is examined. If the resulting speed is lower than a reference value which has been set so that an operation to avoid an overflow of a buffer RAM in the image reading apparatus may not be caused, the sub-scanning speed of the image reading apparatus is set lower, and the image is read at the lower speed.

13 Claims, 6 Drawing Sheets

| MOTOR SPEED S<br>RESOLUTION K | LOW | MEDIUM | HIGH |
|---|---|---|---|
| 600dpi | S6L | S6M | S6H |
| 1200dpi | S12L | S12M | S12H |

IMAGE READING APPARATUS AND METHOD

BACKGROUND OF THE INVENTION

1. Field of the Invention

The present invention relates to an image reading apparatus for reading a document image, a method of controlling the same, and a control program.

2. Description of the Related Art

FIG. 1 is a schematic block diagram of the configuration of an image reading apparatus 200.

In FIG. 1, the image reading apparatus 200 is connected to a host computer 100, and is controlled by the host computer 100. Images from the image reading apparatus 200 are displayed by the host computer 100, and are saved therein.

The host computer 100 includes a CPU (central processing unit) 101 for performing various operations, a RAM (random access memory) 102 which is used as a work area by an operating system or programs, a hard disk 103 for storing the operating system and the programs, a monitor 104, an input device 105 including a mouse and a keyboard, and an interface unit 106 for connecting the host computer 100 to an external device of the image reading apparatus 200.

The interface unit 106 comprises a serial interface, a parallel interface, a SCSI (small computer serial interface), a USB (universal serial bus) interface, and an IEEE 1394 interface.

The image reading apparatus 200 includes a contact image sensor (hereinafter referred to as "CIS") 201, LEDs (light emitting diodes) 202 used as light sources, an LED control circuit 203, an amplifier 204, an analog-to-digital (A/D) converter circuit 205, a shading RAM 206, a shading correction circuit 207, a peak detecting circuit 208, a gamma conversion circuit 209, a buffer RAM 210, a packing/buffer RAM control circuit 211, an interface circuit 212, a motor drive circuit 213, and a motor 214.

FIG. 2 illustrates the configuration of a program stored in the host computer 100 for controlling the image reading apparatus 200. The program includes a TWAIN (Technology Without Any Interested Name) compatible application 301, a TWAIN driver 302, a device driver 303, a port driver 304, and an operating system (OS) 305.

The packing/buffer RAM control circuit 211 controls the motor 214 and the buffer RAM 210 in the following way:

Image data output from the packing/buffer RAM control circuit 211 is written to the buffer RAM 210, and the image data written is read from buffer RAM 210 to the host computer 100 via the interface circuit 212. If a speed at which data is written from the packing/buffer RAM control circuit 211 to the buffer RAM 210 is higher than a speed at which the data is read by the host computer 100 from the RAM 210, the buffer RAM 210 encounters an overflow. The packing/buffer RAM control circuit 211 checks an available space of the buffer RAM 210, and instructs the motor drive circuit 213 to stop reading the image data when the available space equals the amount of one line of the image data. When the buffer RAM 210 becomes empty again, the packing/buffer RAM control circuit 211 instructs the motor drive circuit 213 to resume reading.

Such an operation to avoid an overflow of the buffer RAM 210 is called a start/stop operation (hereinafter referred to as "SS"). When SS is effected, the reading may be resumed either at the stop position of the CIS 210 or at a position back from the stop position. If the reading is resumed at the stop position, the image may discontinue at the stop position, thereby causing degradation of image quality. If the reading is resumed at a position back from the stop position, an extra time is required before the reading can be resumed, thereby making the overall scan time slower. Such inconveniences are inevitable if SS is caused, and it is therefore necessary to minimize SS as much as possible.

Since the driving speed of the motor 214 is proportional to a speed at which the data is written to the buffer RAM 210, the device driver 303 conventionally controls the speed of the motor 214 so that a speed at which the data is written to the buffer RAM 210 from the packing/buffer RAM control circuit 211 is lower than a speed at which the data is read from the buffer RAM 210 by the host computer 100, and so that the data is written to the buffer RAM 210 at the highest speed in the above condition.

The speed of the motor 214 is controlled, assuming that the host computer 100 reads image data from the buffer RAM 210 at a constant rate. If the reading of data by the host computer 100 is interrupted, the buffer RAM 210 becomes full, thereby causing SS.

One possible reason why the reading of data by the host computer 100 is interrupted is swapping of memories. When an image is being read, the TWAIN driver 302 reserves a work area having the same size as the size of the image. If an available space of the RAM 102 is greater than the image size, the RAM 102 is used for the work area. If an available space of the RAM 102 is smaller than the image size, the work area that cannot be stored in the available space of the RAM 102 becomes a virtual memory for which the memory of the hard disk 103 is used. If the work area allocated to the hard disk 103 is accessed, swapping of memories occurs. The swapping might cause data which is being read by the host computer 100 to be interrupted depending upon the performance of the hard disk 103.

SUMMARY OF THE INVENTION

Accordingly, it is an object of the present invention to provide an image reading apparatus which prevents degradation of image quality and a delay in the image reading time which are caused by interruption of reading of image data, and to provide a method of controlling the image reading apparatus.

To achieve the above object, the method of and the apparatus for reading images according to the present invention is constituted as follows.

An image reading apparatus includes: an image reading unit having a photoelectric conversion component for reading light from an image and converting the read image to an image signal; a driving motor for moving the image reading unit and the image relative to each other; a motor control unit for controlling the driving motor; an interface connecting to an external information processing device; a conversion circuit for performing analog-to-digital conversion on the image signal into image data; a memory connected to the interface for storing the image data; and a control signal receiving unit for receiving a motor control signal via the interface. The control signal receiving unit receives the motor control signal which controls the driving motor so as to satisfy the relationship $V1 \leq V2$, where V1 represents a data speed at which the image is read to generate the image data, and V2 represents a data speed at which the image signal read out via the interface is stored in the information processing device as one piece of image data. The motor control unit controls the driving motor according to the received motor control signal.

An image reading system includes an image reading apparatus, and an information processing apparatus. The image reading apparatus includes: an image reading unit having an photoelectric conversion component for reading light from an image and converting the read image to an image signal; a driving motor for moving the image reading unit and the image relative to each other; a motor control unit for controlling the driving motor; a conversion circuit for performing analog-to-digital conversion on the image signal into image data; and an image memory for storing the image data. The information processing apparatus includes: a temporary storage memory for reading and temporarily storing the image data stored in the image memory; a first timer for measuring the speed of the data stored in the temporary storage memory; and a control signal generating unit for outputting a motor control signal to the motor control unit based on the measurement of the first timer. The motor control unit controls the driving motor according to the motor control signal output by the control signal generating unit.

A controlling method for controlling an image reading system includes the steps of: reading image data at a predetermined read speed to generate image data; storing the image data in storage means; reading out the image data stored in the storage means via an interface; temporarily storing the image data, which is read out in the reading out step, in a temporary storage memory; and detecting a speed at which the temporary storage memory temporarily stores the image data. The read speed in the reading step is controlled according to the speed detected in the detecting step.

A method of controlling an image reading includes the steps of: reading an image and generating image data; transmitting the generated image data; processing the transmitted image data; and measuring a processing speed of the image data in the processing step. The reading of the image is controlled so that a speed at which the image data is generated in the image data generating step is lower than the processing speed measured in the measuring step.

Further objects, features and advantages of the present invention will become apparent from the following description of the preferred embodiments with reference to the attached drawings.

DESCRIPTION OF THE PREFERRED EMBODIMENTS

Figure 1:
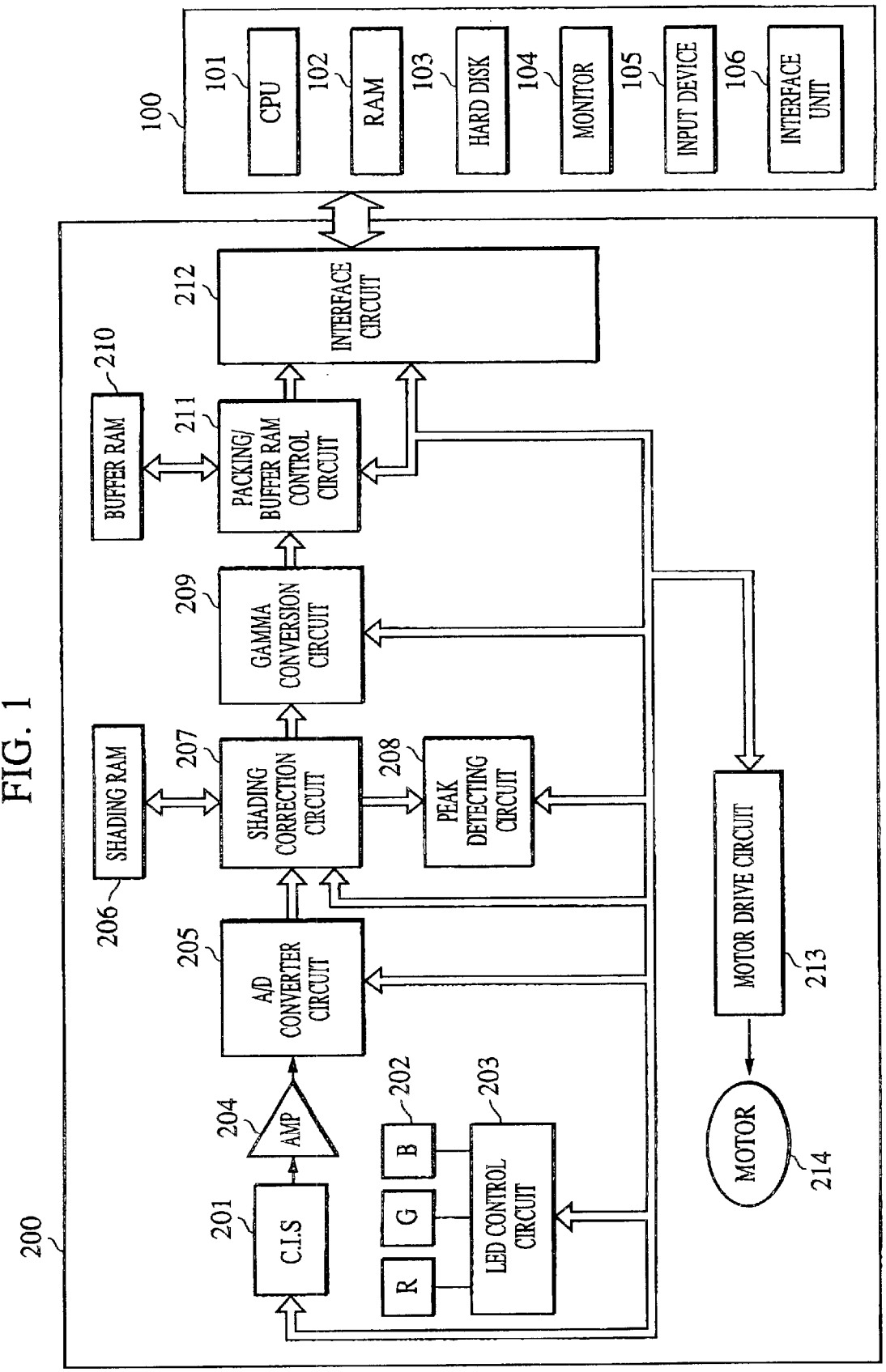
FIG. 1 is a schematic block diagram of the configuration of an image reading apparatus according to the present invention.

Referring to the drawings, embodiments of the present invention are now discussed.

<First Embodiment>

FIG. 1 is a schematic block diagram of the configuration of an image reading apparatus 200 according to a first embodiment of the present invention.

The configuration of the image reading apparatus 200 has been briefly described in the BACKGROUND OF THE INVENTION, and a more detailed description will now be given.

The CIS 201 is combined with the LEDs 202 which are used as light sources. The LED control circuit 203 is used to control light-emission of the RGB-color LEDs 202 every line as the CIS 201 is fed in the scan direction along a glass document table on which a document is placed. Then, the CIS 201 identifies the document on the glass document table as a color image, and sequentially reads the color components every line.

The amplifier 204 amplifies the signal output from the CIS 201, and the A/D converter circuit 205 performs analog-to-digital conversion on the amplified output to obtain, for example, an 8-bit digital output. The shading RAM 206 stores shading correction data for use in calibration. In the calibration, black shading data and white shading data are generated, and are used as chromatic references in order to precisely read colors. The shading correction data is obtained by reading black marks and white marks on the back face of the glass document table, and then processing the resulting data in the host computer 100.

The host computer 100 saves the shading correction data in the hard disk 103, and transmits the shading correction data to the shading RAM 206 when the image reading apparatus 200 is initialized.

Based on the data of the shading RAM 206, the shading correction circuit 207 performs shading correction on the image signal on which analog-to-digital conversion is performed. The peak detecting circuit 208 detects a peak value in the read image data every line, and the resulting peak values are used for the calibration, etc., to coordinate and determine the period in which each of the RGB-color LEDs in the CIS 201 is emitted during the reading of image.

The gamma conversion circuit 209 performs gamma conversion on the read image data according to a gamma curve which is transmitted from the host computer 100.

The buffer RAM 210 temporarily saves the image data so as to coordinate a difference between a speed at which the read image data is generated and a speed at which the data is transmitted to the host computer 10 via the interface 212. The packing/buffer RAM control circuit 211 performs the packing operation according to the image output mode (i.e., binary, 8-bit, 24-bit, or the like) which is preset by the host computer 100, before writing the resulting data to the buffer RAM 210, and reads the image data from the buffer RAM 210 to output the read image data to the host computer 100 via the interface circuit 212.

The interface circuit 212 communicates the control signal, the control data, and the image data to/from the host computer 100.

The motor drive circuit 213 drives the motor 214 at the speed specified by the host computer 100. When the motor 214 is driven, the CIS 201 is fed to perform scanning. The driving speed of the motor 214 is proportional to the output speed of the image data. The motor speed is set when the reading is initiated, and does not change during the reading.

Figure 2:
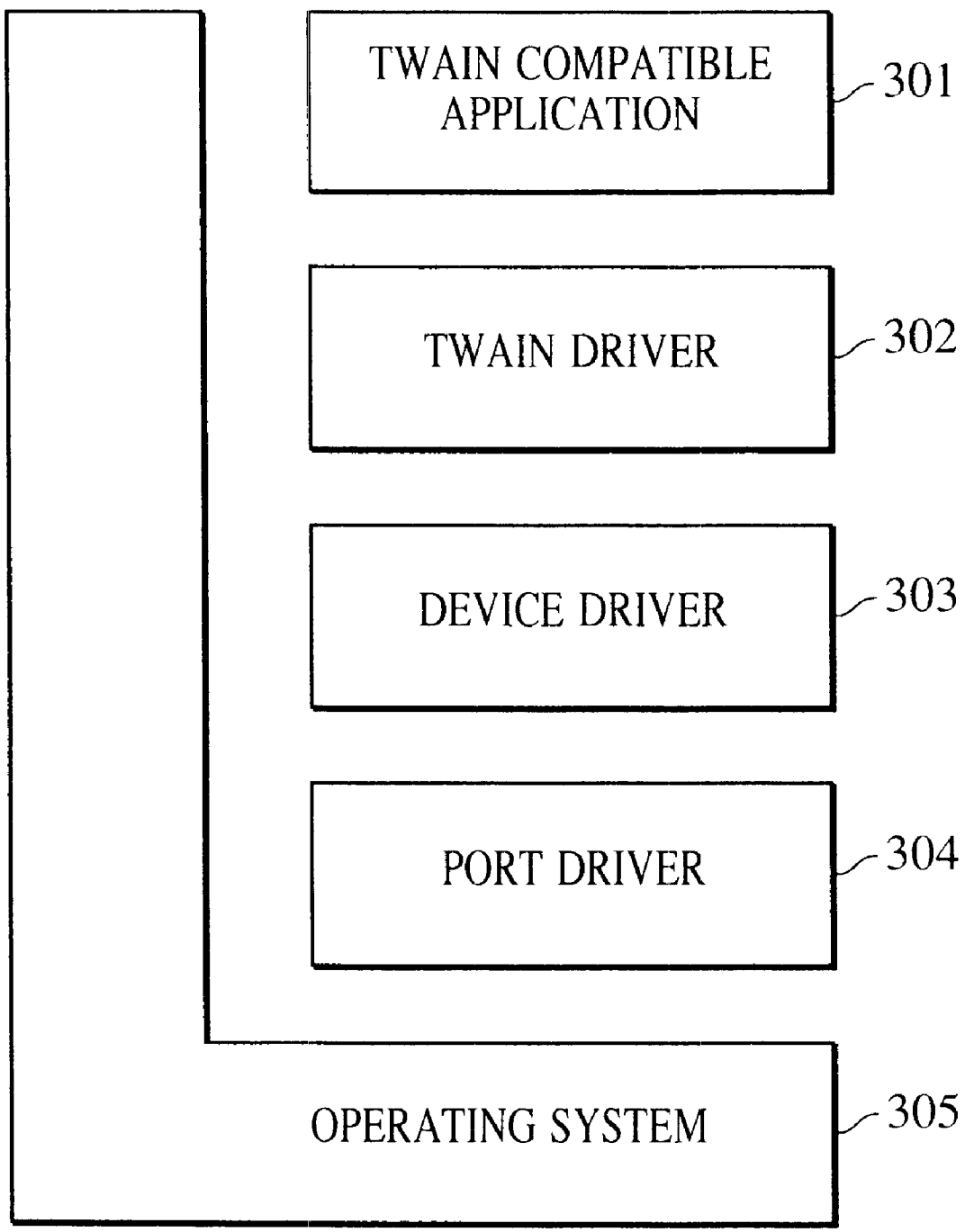
FIG. 2 is an illustration of the configuration of a program for controlling the image reading apparatus shown in FIG. 1.

FIG. 2 is an illustration of the configuration of a program for controlling the image reading apparatus 200 shown in FIG. 1.

The program which controls the image reading apparatus 200 includes a TWAIN compatible application 301, a TWAIN driver 302, a device driver 303, a port driver 304, and an operating system (OS) 305.

The TWAIN compatible application 301 allows an image to be read from the image reading apparatus 200 through the TWAIN driver 302, and to be displayed on the monitor 104. The TWAIN compatible application 302 has the ability to process or save the image according to instructions from users. The TWAIN driver 302, which complies with the TWAIN standard, passes the image from the image reading apparatus 200 to the TWAIN compatible application 301, and provides its own graphical user interface (GUI). The GUI has functions which allow users to preview images, to specify cropped image areas with respect to previewed images, to set resolution, to set the read mode (i.e., binary, 8-bit, 24-bit, or the like), and to perform a chromatic control including gamma correction.

The device driver 303 accesses control registers in the modules of the image reading apparatus 200 to control the shading correction, to set the motor speed according to resolution or cropped image areas, to transmit the gamma-correction data which is received from the TWAIN driver 302 to the image reading apparatus 200, and to perform a flow control for the reading of the image. The port driver 304 controls communication to/from the image reading apparatus 200 according to interfaces including a serial interface, a parallel interface, a SCSI, an USB interface, and an IEEE 1394 interface.

Figure 3:
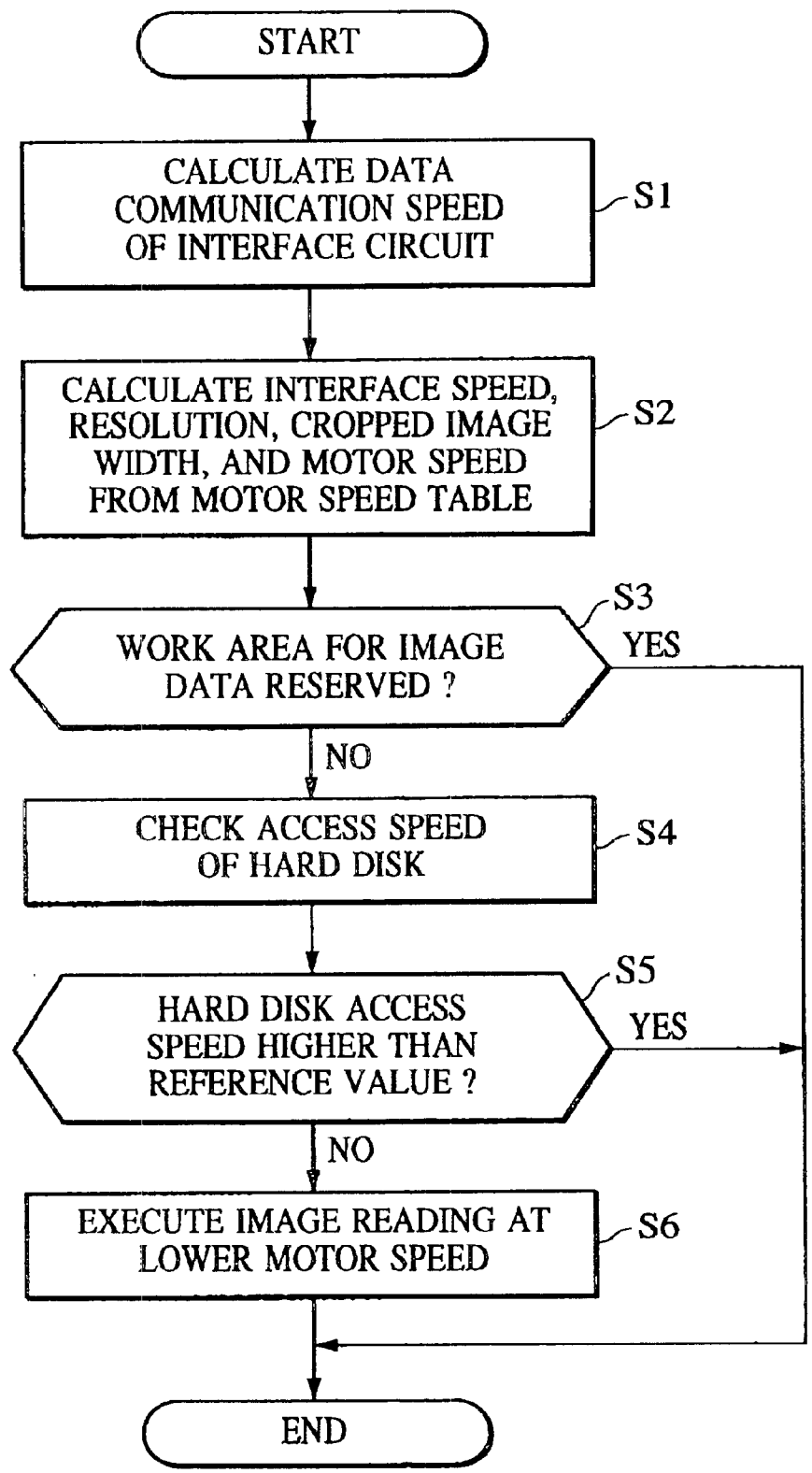
FIG. 3 is a flowchart of a process program to determine a motor speed which is executed by a device driver according to a first embodiment of the present invention.

FIG. 3 is a flowchart of a process program to determine the speed of the motor 214 which is executed by the device driver 303 shown in FIG. 2.

Referring to FIG. 3, the process starts at step S1, in which the device driver 303 calculates the data communication speed I of the interface circuit 212.

Specifically, the data communication speed I is calculated in the following way: First, dummy data is generated in the buffer RAM 210. Then, a timer in the device driver 303 starts, and the dummy data is read in the same mode as that when the image data is read. After the dummy data has been read, the timer stops. The data communication speed I (byte/sec) of the interface circuit 212 (hereinafter referred to as "interface speed I") is calculated from the dummy data volume and the dummy data transfer time. The interface speed I may be determined when the image reading apparatus 200 is initialized.

Figures 4, 5:
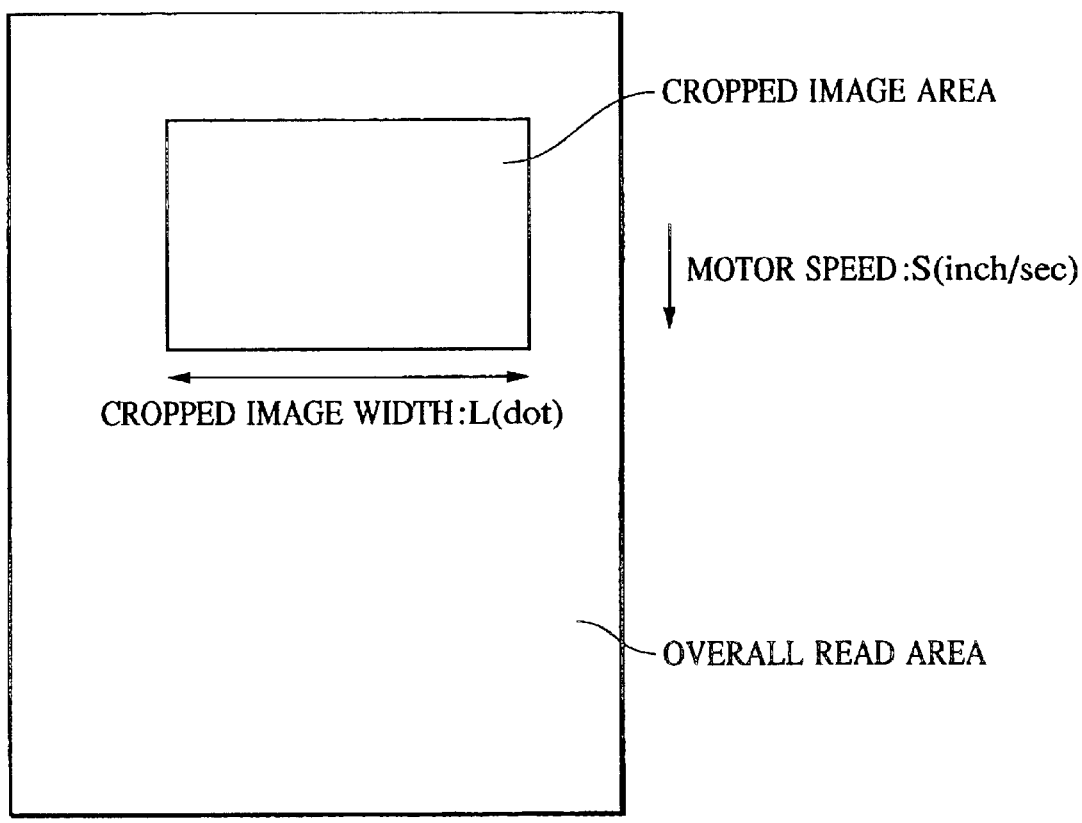
FIG. 4 is an illustration of a read area of the image reading apparatus.
FIG. 5 is a table illustrating a correlation between the motor speed and the resolution.

The program proceeds to step S2, in which the interface speed I (byte/sec), the resolution K (dpi), the cropped image width L (dot), and the motor speed S (inch/sec) from a motor speed table are calculated. In FIG. 4 which shows a read area of the image reading apparatus 200, the cropped image width L is indicated by the number of dots in the width of a cropped image area which has been set by a user on a preview area. If the overall screen is scanned, the cropped image width L is represented by the number of dots in the width of the overall read area. A read speed Vr from the buffer RAM 210 corresponds to the interface speed I (byte/sec), i.e., Vr=I. A write speed Vw (byte/sec) to the buffer RAM 210 is calculated by the following expression in the case of 24-bit color image data (1 dot is equal to 3 bytes):

$$Vw = S \times K \times L \times 3 \quad (1)$$

In order to avoid an overflow of the buffer RAM 210, the read speed Vr from the buffer RAM 210, that is, the interface speed I, must be higher than the write speed Vw (byte/sec) to the buffer RAM 210. In other words, the following relational expression must be satisfied:

$$I\ (byte/sec) > Vw\ (byte/sec) \quad (2)$$

The motor speed S is calculated from expressions (1) and (2), and the following relational expression is found:

$$S < I/3(K \times L) \quad (3)$$

The motor speed S is set at three stages; low, medium, and high depending upon the resolution, as shown in the table in FIG. 5. The highest motor speed in the table shown in FIG. 5, which satisfies expression (3), is selected as the motor speed S when the image is read.

At step S3, it is determined whether or not the work area for the image data can be reserved in the physical memory of the RAM 102. If the work area for the image data can be reserved in the physical memory of the RAM 102, i.e., YES is determined at step S3, the image is read at the motor speed S determined at step S2 because no swapping of memories occurs during the reading of the image. If the work area cannot be reserved, the hard disk 103 is used as a virtual memory. In this case, swapping of memories occurs during the reading of the image, and the access speed of the hard disk 103 is examined (step S4). In this examination, first, dummy data is generated. Then, the timer starts, the generated dummy data is written to the hard disk 103, and the written dummy data is read. The write time and the read time are measured to examine the access speed. This procedure may be performed when the image reading apparatus 200 is initialized.

At step S5, it is determined whether or not the access speed of the hard disk 103 which is examined at step S4 is higher than a reference value. The reference value is set by examining the access speeds of a plurality of hard disks having difference performances, and is set higher than the data speed corresponding to the motor speed determined at step S2 so that SS is not caused even if memories are swapped.

If the access speed is higher than the reference value, i.e., YES is determined at step S5, SS is not caused even if the swapping occurs during the reading of the image. Thus, the image is read at the motor speed S calculated at step S2. If the access speed is lower than the reference value, a motor speed lower than the motor speed S calculated at step S2 is chosen from the table shown in FIG. 5 so that SS may not be caused, and the image is read at the chosen speed (step S6).

Accordingly, in the first embodiment, the access speed of the hard disk 103 is examined, and if the access speed is lower than a reference value, which is set so that SS may not be caused, the motor speed S is set lower before the image is read. This prevents degradation of image quality and a delay in the image reading time which are caused by interruption of reading of image data from the RAM 210 by the host computer 100.

<Second Embodiment>

The second embodiment of the present invention is different from the first embodiment in terms of the method in which the device driver 303 determines the speed of the motor 214, while other structures are the same as those in the first embodiment, and a description thereof is thus omitted.

The method in which the device driver 303 determines the speed of the motor 214 is now described with reference to FIG. 6.

Figure 6:
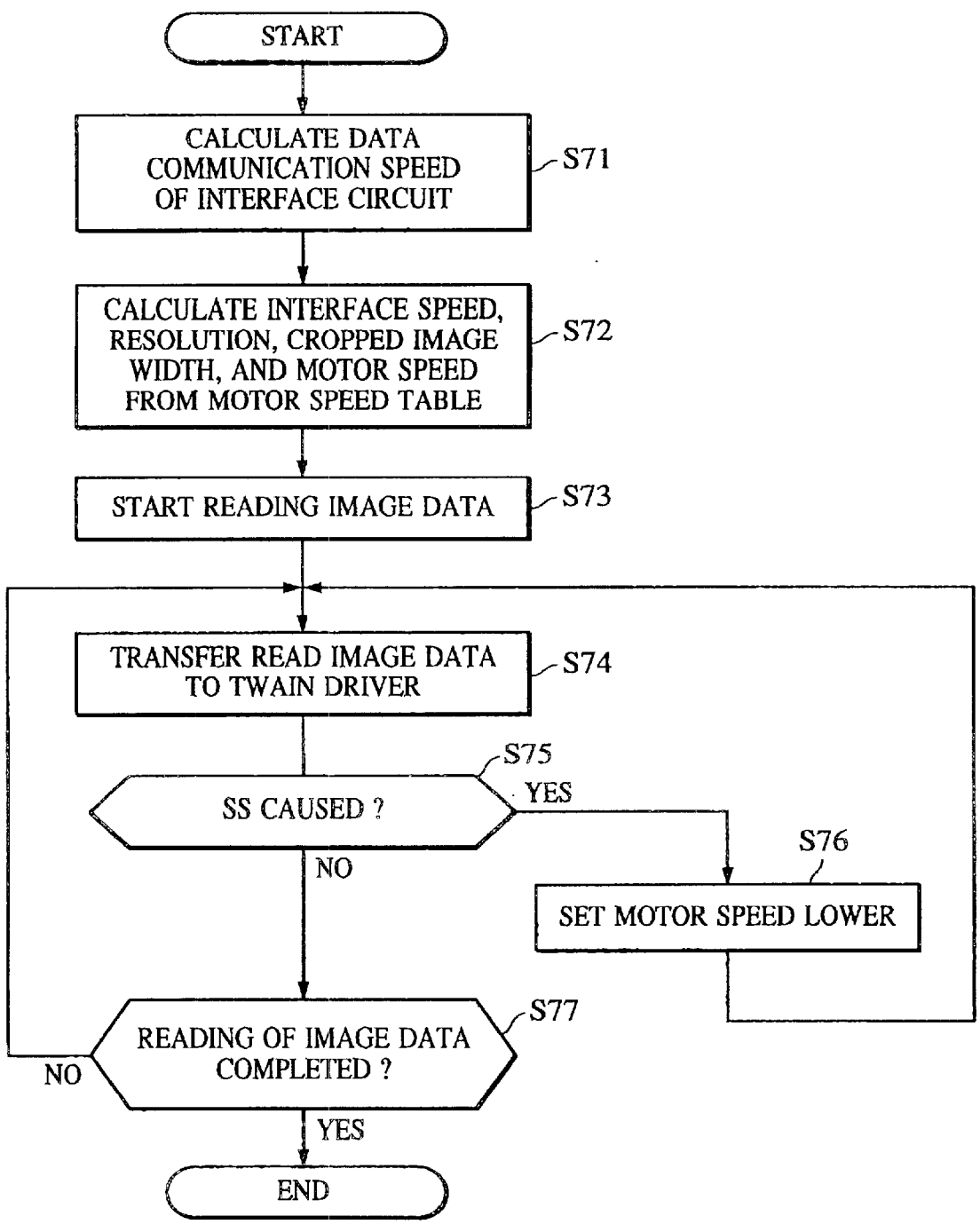
FIG. 6 is a flowchart of a process program to determine a motor speed which is executed by a device driver in the image reading apparatus according to a second embodiment of the present invention.

FIG. 6 is a flowchart of a process program to determine the speed of the motor 214 which is executed by the device driver 303 in the image reading apparatus 200 according to the second embodiment of the present invention.

The process starts at step S71, which is similar to step S1, in which the data communication speed I of the interface circuit 212 is calculated. At step S72, which is similar to step S2, the interface speed I (byte/sec), the resolution K (dpi), the cropped image width L (dot), and the motor speed S (inch/sec) from the motor speed table are calculated.

The process starts reading the image at the motor speed S calculated at step S72 (step S73), and the device driver 303 reads image data from the image reading apparatus 200, and transfers it to the TWAIN driver 302 (step S74).

It is determined at step S75 whether or not SS is caused. Specifically, a status register in the packing/buffer RAM control circuit 211 is read to determine whether or not SS is caused.

If it is determined at step S75 that SS is caused, a motor speed lower than the motor speed S calculated at step S72 is chosen from the table shown in FIG. 5, and the process returns to step S74. Therefore, if SS is caused, the motor speed S is set lower so that SS may be no longer effected. If SS is not caused, it is determined at step S77 whether or not the reading of the image has been completed. If the reading of the image has been completed, the image reading process ends. Otherwise, the process returns to step S74.

Accordingly, in the second embodiment, the status register in the packing/buffer RAM control circuit 211 is read to determine whether or not SS is caused. If SS is caused, the motor speed S is set lower, and the image is read at the lower motor speed S. This prevents degradation of image quality and a delay in the image reading time which are caused by interruption of reading of the data from the RAM 210 by the host computer 100 after SS has been caused.

<Third Embodiment>

The TWAIN driver 302 allows image processing such as reduced moiré fringes, edge enhancement, or removed dust and scratches to be applied to a scanned image. A user can select image processing depending upon the scanned image. The image processing is performed while the image data is being read from a scanner. Therefore, if image processing, which is time-consuming, is selected or if a plurality of image processing operations are selected, the reading of image data from the host computer 100 may be slower, thereby possibly causing SS. The image processing rate depends upon the throughput of PCs or the cropped image width. According to the third embodiment, therefore, the TWAIN driver 302 is used to calculate the image processing speed Sp, and the device driver 303 controls the motor speed S based on the image processing speed Sp.

The third embodiment is different from the first embodiment in terms of the method in which the device driver 303 determines the speed of the motor 214, while other structures are the same as those in the first embodiment, and a description thereof is thus omitted.

The method in which the device driver 303 determines the speed of the motor 214 is now described with reference to FIG. 7.

Figure 7:
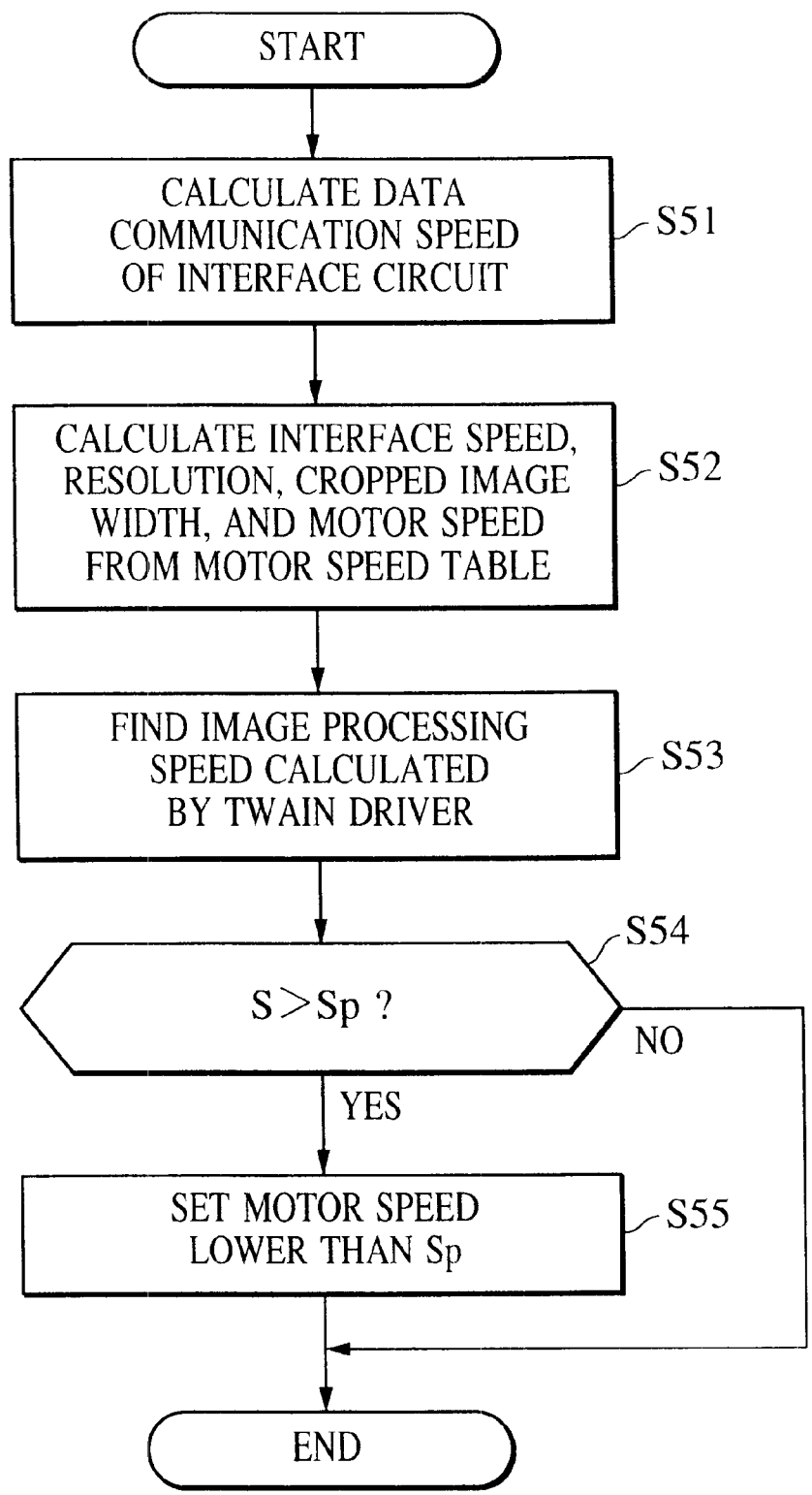
FIG. 7 is a flowchart of a process program to determine a motor speed which is executed by a device driver in the image reading apparatus according to a third embodiment of the present invention.

FIG. 7 is a flowchart of a process program to determine the speed of the motor 214 which is executed by the device driver 303 in the image reading apparatus 200 according to the third embodiment of the present invention.

The process starts at step S51, which is similar to step S1, in which the data communication speed I of the interface circuit 212 is calculated. At step S52, which is similar to step S2, the interface speed I (byte/sec), the resolution K (dpi), the cropped image width L (dot), and the motor speed S (inch/sec) from the motor speed table are calculated.

At step S53, the image processing speed Sp calculated by the TWAIN driver 302 is obtained. The TWAIN driver 302 calculates the image processing speed Sp (inch/sec) in the following way: First, dummy image data corresponding to one inch in the cropped image width L of a scanned image is generated. The image processing operation selected by a user is performed on the dummy image data, and the time required for the image processing is measured. The measured time corresponds to the image processing speed Sp (inch/sec).

At step S54, it is determined whether or not the motor speed S (inch/sec) calculated at step S52 is higher than the image processing speed Sp calculated at step S53. If the motor speed S (inch/sec) is higher than the image processing speed Sp (inch/sec), the motor speed table is referred to, and the motor speed S is set lower than the image processing speed Sp (step S55). Then, the process ends. On the other hand, if the motor speed S (inch/sec) is lower than the image processing speed Sp (inch/sec), the image is read at the initial motor speed S, and the process skips the step S55 and terminates.

Accordingly, in the third embodiment, if the motor speed S is higher than the image processing speed Sp, the motor speed S is set lower than the image processing speed Sp. This prevents degradation of image quality and a delay in the image reading time which are caused by interruption of reading of the data from the RAM 210 by the host computer 100.

The present invention is not limited to the above embodiments, and various changes and modifications can be made within the spirit and scope of the present invention. Therefore, to apprise the public of the scope of the present invention, the following claims are made.

What is claimed is:

1. An image reading system comprising:
    (A) an image reading apparatus comprising:
        (i) an image reading unit having a photoelectric conversion component for reading light from an image and converting the read image to an image signal;
        (ii) a driving motor for moving said image reading unit and the image relative to each other;
        (iii) a motor control unit for controlling said driving motor;
        (iv) a conversion circuit for performing analog-to-digital conversion on the image signal into image data; and
        (v) an image memory for storing the image data; and
    (B) an information processing apparatus comprising:
        (i) a temporary storage memory for reading and temporarily storing the image data stored in said image memory;
        (ii) a first timer for measuring the speed of the data stored in said temporary storage memory; and
        (iii) a control signal generating unit for outputting a motor control signal to said motor control unit based on the measurement of said first timer,
    wherein said motor control unit controls said driving motor according to the motor control signal output by said control signal generating unit,
    wherein, based on the measurement of said first timer, said control signal generating unit outputs the motor control signal which controls said driving motor so as to satisfy the relationship $V1 \leq V2$, where V1 represents a data speed at which the image is read to generate the image data, and V2 represents a data speed at which the image data is stored in said temporary storage memory, and wherein said motor control unit controls said driving motor according to the motor control signal.

2. The image reading system of claim 1, further comprising:

an interface for connecting said image reading apparatus to said information processing apparatus; and a second timer for measuring the speed of the data read out from said image memory via said interface, wherein said control signal generating unit outputs the motor control signal to said motor control unit based on the measurements of said first and second timers.

3. The image reading system of claim 2, wherein said control signal generating unit outputs the motor control signal which controls said driving motor so as to satisfy the relationship $V1 \leq V3$, where V3 represents a data speed at which the image data is read out from said image memory via said interface based on the measurement of said second timer.

4. The image reading system of claim 1, wherein said temporary storage memory has a second temporary storage memory as a virtual memory, and wherein said first timer measures the speed of the data stored in said second temporary storage memory.

5. The image reading system of claim 1, wherein said information processing apparatus further comprises an image processing unit for performing image processing on the image data read from said image memory, and wherein said temporary storage memory stores the image data on which the image processing is performed by said image processing unit.

6. The image reading system of claim 5, wherein said first timer measures an image processing speed of said image processing unit.

7. A controlling method for controlling an image reading system, comprising the steps of:

reading image data at a predetermined read speed to generate image data;

storing the image data in storage means;

reading out the image data stored in the storage means via an interface;

temporarily storing the image data, which is read out in the reading out step, in a temporary storage memory; and detecting a speed at which the temporary storage memory temporarily stores the image data, wherein the read speed in the reading step is controlled according to the speed detected in the detecting step, said controlling method further comprising the step of controlling the read speed of the image data to be lower if the speed detected in the detecting step is lower than a predetermined value.

8. The method of claim 7, wherein the predetermined value is higher than a transmission rate of the interface.

9. The method of claim 7, wherein the detecting step includes detecting a speed at which the image data is stored in a virtual memory as the temporary storage memory.

10. The method of claim 9, wherein the detecting step includes detecting at least one of a write speed to and a read speed from the virtual memory.

11. The method of claim 7, further comprising the step of performing image processing on the image data read out in the reading out step, wherein the image data on which the image processing is performed in the image processing step is stored in the temporary storage memory.

12. The method of claim 11, wherein the detecting step includes detecting an image processing speed in the image processing step.

13. A recording medium having a computer-executable program recorded therein, the program implementing a method according to claim 7 in an image reading system comprising an image reading apparatus and a computer.

* * * * *